United States Patent
Divi et al.

(10) Patent No.: US 10,397,797 B2
(45) Date of Patent: Aug. 27, 2019

(54) DEVICES, SYSTEMS, AND METHODS FOR RESOURCE ALLOCATION OF SHARED SPECTRUM

(71) Applicant: ATC Technologies, LLC, Reston, VA (US)

(72) Inventors: Vijay Divi, San Francisco, CA (US); Sourav Dey, San Francisco, CA (US); Todd Parker, Escondido, CA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 0 days.

(21) Appl. No.: 15/982,980

(22) Filed: May 17, 2018

(65) Prior Publication Data

US 2018/0338246 A1    Nov. 22, 2018

Related U.S. Application Data

(60) Provisional application No. 62/507,705, filed on May 17, 2017.

(51) Int. Cl.
*H04W 16/10* (2009.01)
*H04W 28/16* (2009.01)
(Continued)

(52) U.S. Cl.
CPC ........... *H04W 16/14* (2013.01); *H04W 16/28* (2013.01); *H04W 28/16* (2013.01); *H04W 16/10* (2013.01); *H04W 88/16* (2013.01)

(58) Field of Classification Search
CPC ..... H04W 16/14; H04W 16/10; H04W 28/16; H04W 88/16
(Continued)

(56) References Cited

U.S. PATENT DOCUMENTS

| 6,754,714 B1 * | 6/2004 | Chebrolu | H04L 67/1002 |
| | | | 709/226 |
| 2010/0157910 A1 * | 6/2010 | Nentwig | H04L 5/0007 |
| | | | 370/329 |

(Continued)

OTHER PUBLICATIONS

PCT/US2018/033274 International Search Report and Written Opinion dated Aug. 7, 2018 (15 pages).

*Primary Examiner* — William Nealon
(74) *Attorney, Agent, or Firm* — Michael Best & Friedrich LLP (57) ABSTRACT

Devices, systems, and methods for resource allocation of shared spectrum. In one embodiment, a server includes a communication interface, a memory, and an electronic processor. The communication interface configured to communicate with one or more servers via a backchannel, and control a terrestrial antenna to provide a wireless network. The electronic processor is configured to allocate bid units, determine whether an increase in spectrum is needed, control the communication interface to transmit a specified number of the bid units to the one or more servers over the backchannel, receive zero or more external bid units from each of the one or more servers, determine whether the zero or more external bid units from the each of the one or more servers is more than or equal to the specified number of the bid units, and control the communication interface to transmit information via the wireless network using the increase in the spectrum.

17 Claims, 4 Drawing Sheets

(51) Int. Cl.
*H04W 88/16* (2009.01)
*H04W 16/14* (2009.01)
*H04W 16/28* (2009.01)

(58) Field of Classification Search
USPC ........................................................ 455/446
See application file for complete search history.

(56) References Cited

U.S. PATENT DOCUMENTS

2014/0355429 A1* 12/2014 Smith ............... H04W 28/0226
370/230
2014/0357218 A1* 12/2014 Andrianov ............ H04W 16/14
455/406
2018/0146380 A1* 5/2018 Srikanteswara ...... H04W 16/14

* cited by examiner

DEVICES, SYSTEMS, AND METHODS FOR RESOURCE ALLOCATION OF SHARED SPECTRUM

CROSS-REFERENCE TO RELATED APPLICATION

This application claims the benefit of U.S. Provisional Patent Application No. 62/507,705, filed on May 17, 2017, the entire content of which is hereby incorporated by reference.

FIELD

The present disclosure relates generally to wireless communication systems. More specifically, the present disclosure relates to resource allocation between wireless communication networks that share spectrum in a wireless communication system.

BACKGROUND

For conventional wireless networks, the frequency band that a wireless network utilizes is determined via an allocation by the Federal Communications Commission (FCC). Conventionally, when a wireless network is communicating over long distances, another wireless network is not authorized to communicate over the same frequency band in the region. Due to variability in traffic demand in most wireless networks, spectrum usage varies in efficiency over time.

SUMMARY

In order to more efficiently utilize spectrum, multiple independent networks may share usage of a spectrum band and allow for coordination/collaboration between wireless networks via a communication backchannel. In the present disclosure, messages are transmitted between wireless networks via gateway servers (also referred to herein as "server") to coordinate spectrum usage. The gateway servers can communicate with all nodes (also referred to herein as "antenna") of a given network so that the spectrum access rights of all nodes can be controlled by the gateway server. This allows the gateway servers to speak for the entire network. The messaging may allow for spectrum sharing, but due to varying loads of wireless networks, a structured mechanism for indicating a "need to communicate" is needed as the need varies over time.

A goal of any wireless network is to increase throughput and decrease latency. However, the need to increase throughput and decrease latency is not even throughout time. In some instances, a wireless network has a more immediate need to increase throughput and decrease latency, and in other instances, increasing throughput and decreasing latency is relatively less important. For example, when a wireless network has a large backlog of information to transmit, or had failed communications causing delays, or has an emergency message to get across, any of these scenarios would lead to an increased need to transmit.

The utility function of the individual wireless network increases when that wireless network may improve communications during a period when there is an immediate need to transmit. Thus, it is the goal of the entire system to prioritize wireless networks under these situations, to the extent that each wireless network is treated similarly, i.e. under fair sharing policies. For example, it is beneficial for a single wireless network to yield bandwidth to other wireless networks that have an immediate need to transmit, provided that the other wireless networks will reciprocate the benefit to the single wireless network.

For example, in one embodiment, the present disclosure includes a server. The server includes a communication interface, a memory, and an electronic processor. The communication interface configured to communicate with one or more servers via a backchannel, and control a terrestrial antenna to provide a wireless network. The electronic processor communicatively connected to the memory and configured to allocate bid units, determine whether an increase in spectrum is needed for the wireless network, the wireless network sharing the spectrum with wireless networks provided by the one or more servers, responsive to determining that the increase in the spectrum is needed for the wireless network, control the communication interface to transmit a specified number of the bid units to the one or more servers over the backchannel, receive zero or more external bid units from each of the one or more servers, determine whether the zero or more external bid units from the each of the one or more servers is more than or equal to the specified number of the bid units, and responsive to determining that the zero or more external bid units from the each of the one or more servers is not more than or equal to the specified number of the bid units, control the communication interface to transmit information via the wireless network using the increase in the spectrum.

In another embodiment, the present disclosure includes a wireless communication system. The wireless communication system includes a first server providing a first wireless network and a second server providing a second wireless network using the same spectrum as the first wireless network. The first server includes a communication interface, a memory, and an electronic processor. The communication interface is configured to communicate with one or more servers via a backchannel, the one or more servers including the second server, and control a terrestrial antenna to provide the first wireless network. The electronic processor is communicatively connected to the memory and configured to allocate bid units, determine whether an increase in the spectrum is needed for the first wireless network, responsive to determining that the increase in the spectrum is needed for the first wireless network, control the communication interface to transmit a specified number of the bid units to the one or more servers over the backchannel, receive zero or more external bid units from each of the one or more servers, determine whether the zero or more external bid units from the each of the one or more servers is more than or equal to the specified number of the bid units, and responsive to determining that the zero or more external bid units from the each of the one or more servers is not more than or equal to the specified number of the bid units, control the communication interface to transmit information via the first wireless network using the increase in the spectrum.

In yet another embodiment, the present disclosure includes a method for operation a server to provide a wireless network. The method includes allocating, with an electronic processor, bid units. The method includes determining, with the electronic processor, whether an increase in spectrum is needed for the wireless network, the wireless network sharing the spectrum with wireless networks provided by the one or more servers. The method includes controlling, with the electronic processor, a communication interface to transmit a specified number of the bid units to one or more servers over a backchannel in response to determining that the increase in the spectrum is needed for the wireless network. The method includes receiving, with the electronic processor, zero or more external bid units from each of one or more servers. The method includes determining, with the electronic processor, whether the zero or more external bid units are more than or equal to the specified number of the bid units. The method also includes controlling, with the electronic processor, the communication interface to transmit information via the wireless network using the increase in the spectrum in response to determining that the zero or more external bid units are not more than or equal to the specified number of the bid units.

DETAILED DESCRIPTION OF EXEMPLARY EMBODIMENTS

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
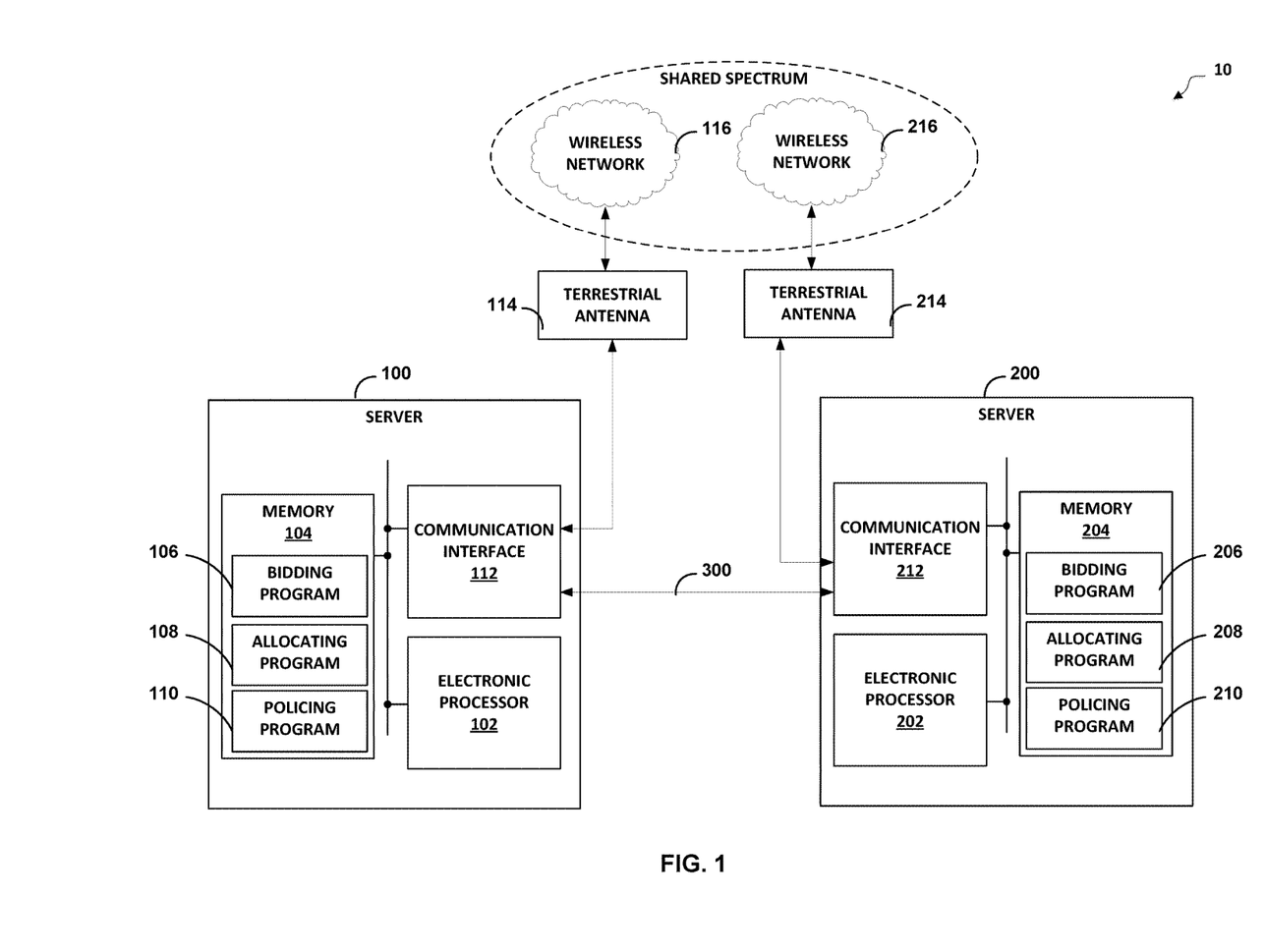
FIG. 1 is a block diagram illustrating a wireless communication system, according various embodiments of the present disclosure.

FIG. 1 is a block diagram illustrating a wireless communication system 10, according various embodiments of the present disclosure. In the example of FIG. 1, the wireless communication system includes a server 100 and a server 200.

It should be understood that, in some embodiments, there may more than the two servers 100 and 200 in configurations different from that illustrated in FIG. 1. The functionality described herein may be extended to any number of servers providing any number of wireless networks that share spectrum with each other.

In the example of FIG. 1, the server 100 includes an electronic processor 102 (for example, a microprocessor or another suitable processing device), a memory 104 (for example, a non-transitory computer-readable storage medium), and a communication interface 112. It should be understood that, in some embodiments, the server 100 may include fewer or additional components in configurations different from that illustrated in FIG. 1. Also the server 100 may perform additional functionality than the functionality described herein. In addition, the functionality of the server 100 may be incorporated into other servers. As illustrated in FIG. 1, the electronic processor 102, the memory 104, and the communication interface 112 are electrically coupled by one or more control or data buses enabling communication between the components.

The memory 104 may include a program storage area (for example, read only memory (ROM)) and a data storage area (for example, random access memory (RAM), and other non-transitory, machine-readable medium). In some examples, the program storage area may store the instructions regarding a bidding program 106, an allocation program 108, and a policing program 110. In some examples, the data storage area stores the allotted bid units. Additionally, in some examples, the data storage area stores the external bid units transmitted by other servers.

The bidding program 106 has instructions that provide, for a fixed time interval T, also referred to as an Epoch, that server 100 receives an allocation of B bid units or generates an allocation of B bid units. The allocation may be received from an external, trusted server or generated by the server using a trusted software module. The trusted external entity or trusted software in the bidding program ensures that the bid units are fairly allocated among the servers of different wireless networks sharing the common spectrum. Bid units may be used by server 100 to communicate to other server 200 a temporary need for a greater than a nominal share of the shared spectrum resources. The server 100 may "spend" the B units over the fixed time interval T via messages to the second server 200 via a backchannel 300. In subintervals of the fixed time interval T, also referred to as Transmit Time Period, where the need of the server 100 to transmit is a high priority, the server 100 may use more of the B units, relating to intent to consume more of the shared spectrum. The second server 200 listening to the messages may then decrease spectrum consumption during those intervals to accommodate the server 100. After time interval T, the server 100 will reset the B units.

Figure 2:
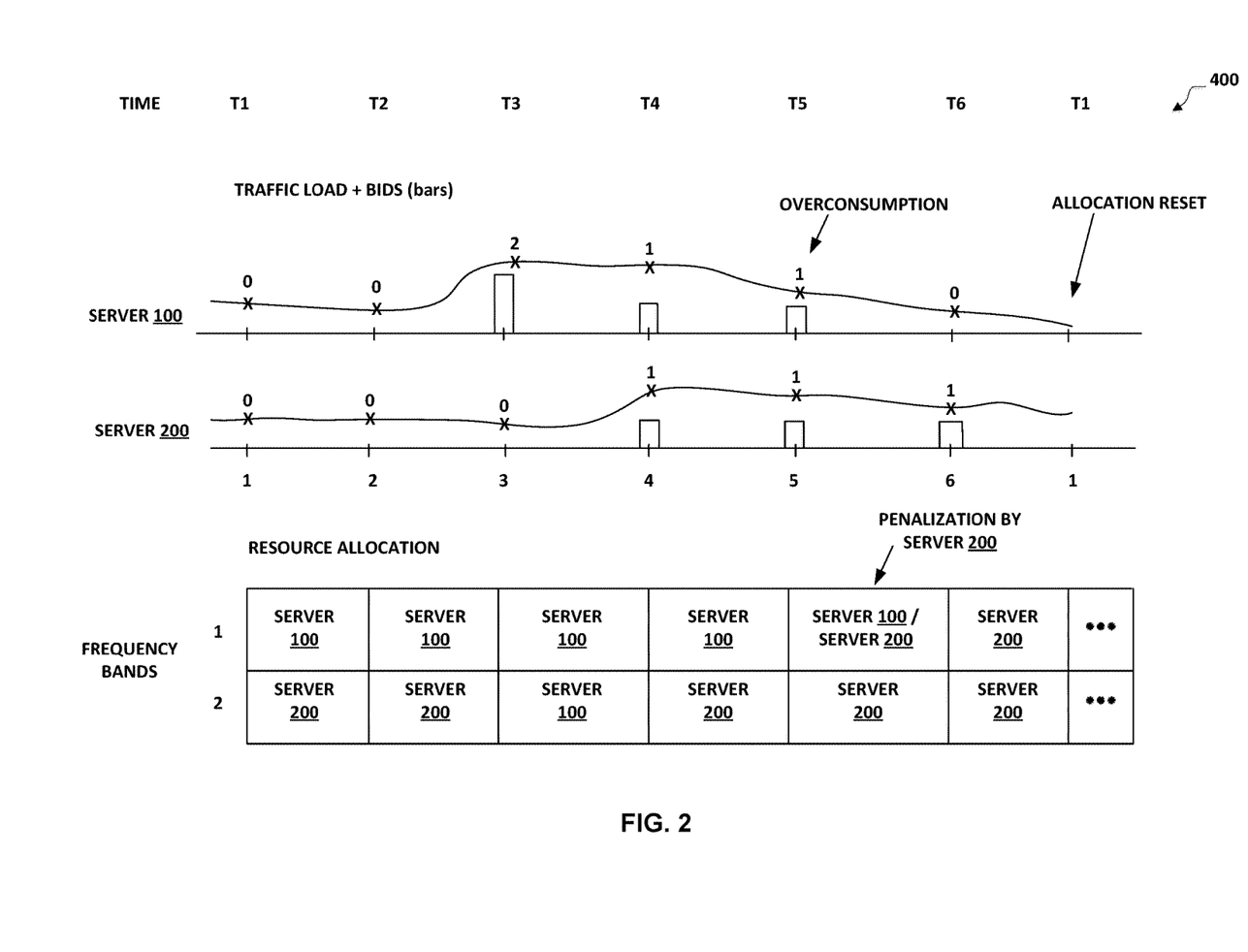
FIG. 2 is a diagram illustrating an example of bidding, allocating, and policing operations of the wireless communication system of FIG. 1, according to various embodiments of the present disclosure.

The allocation program 108 has instructions that provide for bids as the bids are received by the server 100, and spectrum resources will be allocated between the servers 100 and 200. The allocation may be determined by pre-defined rules or dynamically set by the server 100. For example, the pre-defined rules may specify be a pre-determined upper limit to the number of bids units that may be transmitted from one server to another during for a pre-determined Epoch. In the example of FIG. 2 below, the specified, upper-limit number is three bid units and the Epoch is a 6 minute interval.

The policing program 110 has instructions that ensure fair play between the server 100 and the second server 200. For example, the server 100 (or a central agency) may impose penalties onto the second server 200 when the second server 200 does not appropriately indicate a need to transmit (for example, using more than B units during the fixed time interval T, or consuming significant shared spectrum without communicating a need to use additional shared spectrum). In some embodiments, penalties may include ignoring a "need to transmit" message or messages.

The electronic processor 102 executes machine-readable instructions stored in the memory 104. For example, the electronic processor 102 may execute instructions stored in the memory 104 to perform the functionality described in greater detail below.

The communication interface 112 receives data from and provides data to devices external to the server 100, such the terrestrial antennas 114 and the second server 200. For example, the communication interface 112 may include a port or connection for receiving a wired connection (for example, an Ethernet cable, fiber optic cable, a telephone cable, or the like), a wireless transceiver, or a combination thereof.

In the example of FIG. 1, the second server 200 includes an electronic processor 202 (for example, a microprocessor or another suitable processing device), a memory 204 (for example, a non-transitory computer-readable storage medium), and a communication interface 212. It should be understood that, in some embodiments, the second server 200 may include fewer or additional components in configurations different from that illustrated in FIG. 1. Also the second server 200 may perform additional functionality than the functionality described herein. In addition, the functionality of the second server 200 may be incorporated into other servers. As illustrated in FIG. 1, the electronic processor 202, the memory 204, and the communication interface 212 are electrically coupled by one or more control or data buses enabling communication between the components.

The memory 204 may include a program storage area (for example, read only memory (ROM)) and a data storage area (for example, random access memory (RAM), and other non-transitory, machine-readable medium). In some examples, the program storage area may store the instructions regarding a bidding program 206, an allocation program 208, and a policing program 210. In some examples, the data storage area stores the allotted bid units. Additionally, in some examples, the data storage area stores the external bid units transmitted by other servers.

The bidding program 206 has instructions that provide, for a fixed time interval T, also referred to as an Epoch, that the second server 200 receives an allocation of B bid units or generates an allocation of B bid units. The allocation may be received from an external, trusted server or generated by the server using a trusted software module. The trusted external entity or trusted software in the bidding program ensures that the bid units are fairly allocated among the servers of different wireless networks sharing the common spectrum. Bid units may be used by the second server 200 to communicate to the server 100 a temporary need for a greater than a nominal share of the shared spectrum resources. The second server 200 may "spend" the B units over the fixed time interval T via messages to the server 100 via the backchannel 300. In subintervals of the fixed time interval T, also referred to as Transmit Time Period, where the need of the second server 200 to transmit is a high priority, the second server 200 may use more of the B units, relating to intent to consume more of the shared spectrum. The server 100 listening to the messages may then decrease spectrum consumption during those intervals to accommodate the second server 200. After time interval T, the second server 200 will reset the B units.

The allocation program 208 has instructions that provide for bids as the bids are received by the second server 200, and spectrum resources will be allocated between the server 100 and the second server 200. The allocation may be determined by pre-defined rules or dynamically set by the second server 200. For example, the pre-defined rules may specify be a pre-determined upper limit to the number of bids units that may be transmitted from one server to another during for a pre-determined Epoch. In the example of FIG. 2 below, the specified, upper-limit number is three bid units and the Epoch is a 6 minute interval.

The policing program 210 has instructions that ensure fair play between the second server 200 and the server 100. For example, the second server 200 (or a central agency) may impose penalties onto the server 100 when the server 100 does not appropriately indicate a need to transmit (for example, using more than B units during a fixed time interval T, or consuming significant shared spectrum without communicating a need to use additional shared spectrum). In some embodiments, penalties may include ignoring a "need to transmit" message or messages.

The electronic processor 202 executes machine-readable instructions stored in the memory 204. For example, the electronic processor 202 may execute instructions stored in the memory 204 to perform the functionality described in greater detail below.

The communication interface 212 receives data from and provides data to devices external to the second server 200, such the terrestrial antennas 214 and the server 100. For example, the communication interface 212 may include a port or connection for receiving a wired connection (for example, an Ethernet cable, fiber optic cable, a telephone cable, or the like), a wireless transceiver, or a combination thereof. In the example of FIG. 1, the communication interface 212 is communicatively connected to the communication interface 112 via a backchannel 300 for collaboration and coordination of servers 100 and 200.

In some examples, the servers 100 and 200 may include one or more optional user interfaces (not shown). The one or more optional user interfaces include one or more input mechanisms (for example, a touch screen, a keypad, a button, a knob, and the like), one or more output mechanisms (for example, a display, a printer, a speaker, and the like), or a combination thereof. The one or more optional user interfaces receive input from a user, provide output to a user, or a combination thereof. In some embodiments, as an alternative to or in addition to managing inputs and outputs through the one or more optional user interfaces, the servers 100 and 200 may receive user input, provide user output, or both by communicating with an external device, such as a console computer, over a wired or wireless connection (for example, through the communication interfaces 112 and/or 212).

FIG. 2 is a diagram 400 illustrating an example of bidding, allocating, and policing operations of the wireless communication system 10 of FIG. 1, according to various embodiments of the present disclosure. In the example of FIG. 2, two wireless networks A and C (for example, wireless network 116 provided by server 100 and wireless network 216 provided by server 200 of FIG. 1) share spectrum, i.e., two frequency bands, F1 and F2. The servers 100 and 200 are each given 3 bidding units to use over a 6 minute interval to indicate a strong need to transmit. In some examples, a bidding subinterval lasts for 1 minute, which is the time period for which the spectrum is allocated.

At time T1, both servers 100 and 200 experience normal loads. The servers 100 and 200 do not transmit any bid over the backchannel 300. The server 100 provides wireless network A on F1. The server 200 provides wireless network C on F2.

At time T2, both servers 100 and 200 experience normal loads. The servers 100 and 200 do not transmit any bid over the backchannel. The server 100 provides wireless network A on F1. The server 200 provides wireless network C on F2.

At time T3, the server 100 receives an emergency message and bids 2 units over the backchannel. The server 200 does not transmit a bid over the backchannel. The server 100 provides wireless network A on F1 and F2. The server 200 accommodates the server 100 by not providing the wireless network C on either F1 or F2.

At time T4, the servers 100 and 200 both have increased loads and each bid 1 unit over the backchannel. Since the bids are at the same time, the spectrum is shared between the servers 100 and 200. The server 100 transmits on F1. The server 200 transmits on F2.

At time T5, the servers 100 and 200 both have increased loads and each bid 1 unit over the backchannel. The server 100 has overspent the 3 allocated units. The server 200 may implement a policing program (for example, policing program 110 as described above in FIG. 1) for penalizing the server 100 for some amount of time. For example, the server 200 may penalize the server 100 by commanding it to cease transmission for some number of Transmit Times.

At time T6, the server 200 bids 1 unit over the backchannel. The server 100 does not bid over the backchannel, being under penalty. The server 200 wins the bidding and transmits on F1 & F2.

At time T1, the servers 100 and 200 reset their bid units to 3. In other examples, the servers 100 and 200 may increase or decrease their allotted bid units (e.g., two bid units or two-hundred bid units) while also increasing or decreasing the reset period to match the increase or decrease in the allotted bid units.

The bidding/allocation/policing programs create a Nash equilibrium which is mutually beneficial to both the servers 100 and 200. The Nash equilibrium provides a stable way for addressing the shared-spectrum inefficiencies that arise when the servers 100 and 200 each have a "need to transmit" that varies over time. By allowing wireless networks to increase spectrum usage during relatively more high-demand periods, the utility of each individual wireless network increases, especially due to the often non-linear utility function.

One alternative embodiment is a single iteration. In the single iteration the bidding units are not reset at any point in time.

Another alternative embodiment is non-uniform allocations of bid units. For example, bidding allocations may not necessarily be even across wireless networks because wireless networks with more users may receive higher allocations of bid units.

Another alternative embodiment is a cash value. For example, bid units B may be tied to a cash value through a cryptocurrency, where wireless networks are required to buy bid units B. The cash value alternative may also utilize blockchain-style distributed ledgers for the policing of units spent.

Yet another alternative embodiment is a learning program. For example, wireless networks may utilize bidding messages by learning the responding actions and policing program of other wireless networks in order to increase efficiencies in the bidding process.

Figure 3:
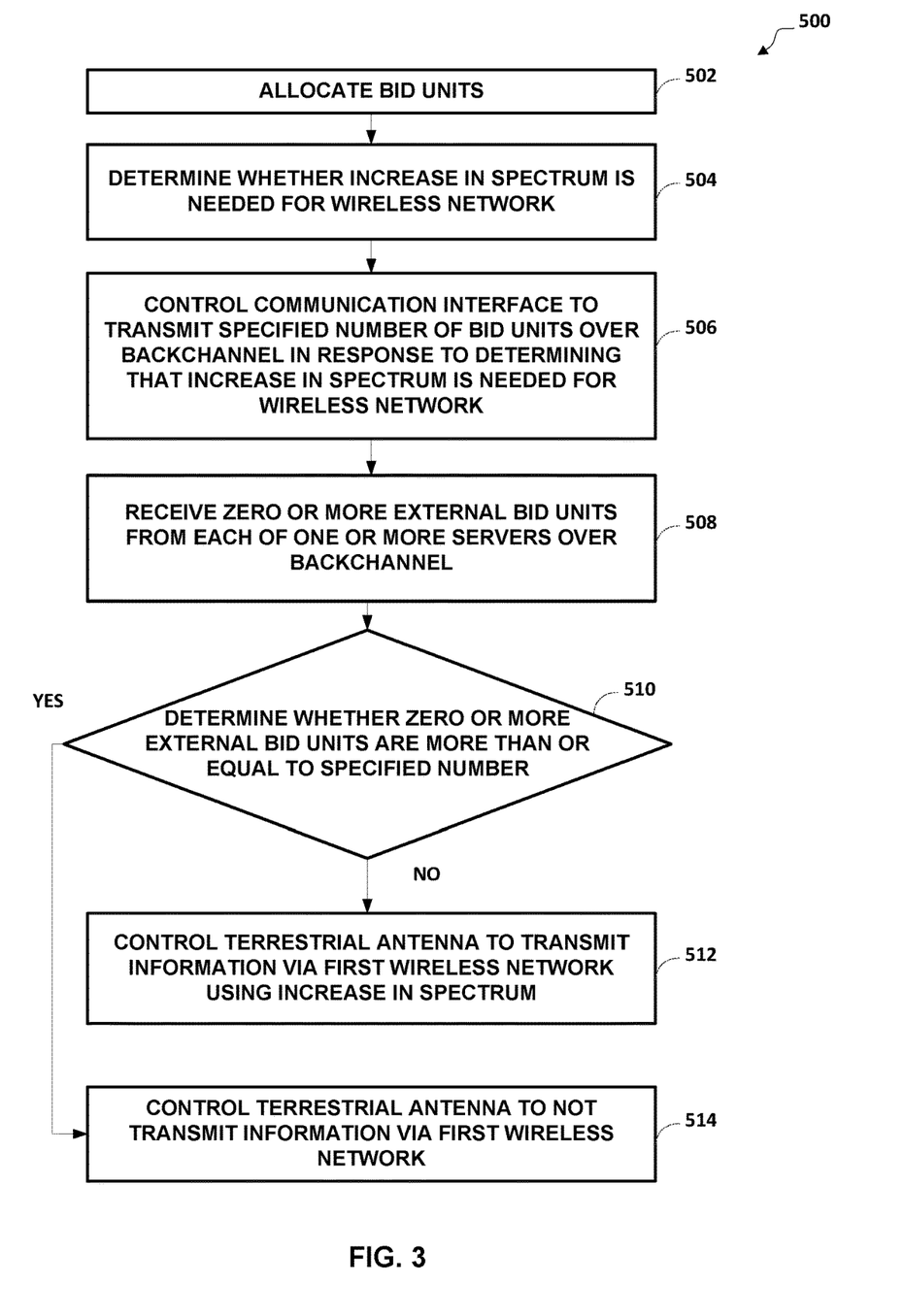
FIG. 3 is a flowchart illustrating a method for operating a server with the allocating and bidding programs, according to various embodiments of the present disclosure.

FIG. 3 is a flowchart illustrating a method 500. The method 500 is a method for operating a server with the allocating and bidding programs, according to various embodiments of the present disclosure. For ease of understanding, the method 500 is described with respect to the server 100 of the wireless communication system 10 of FIG. 1 and FIG. 2. However, the method 500 is equally applicable to the server 200 of FIG. 1 or any other additional servers of the wireless communication system 10.

The method 500 includes allocating, with the electronic processor 102, bid units (at block 502). For example, the electronic processor 102 sets or resets a number of bid units available at time T1 of FIG. 2 using the allocating program 108 of FIG. 1. In some examples, the bid units are predetermined number. In the example of FIG. 2, the predetermined number is 3.

The method 500 includes determining, with the electronic processor 102, whether an increase in spectrum is needed for the first wireless network 116 that shares spectrum with the second wireless network 216 of the server 200 (at block 504). For example, the electronic processor 102 receives a high-priority message via the communication interface 112 and determines that the high-priority message requires a high-priority transmission by the communication interface 112 when the first wireless network 116 has an increased load.

The method 500 includes controlling, with the electronic processor 102, the communication interface 112 to transmit a specified number of bid units over the backchannel 300 in response to determining that the increase in the spectrum is needed for the first wireless network 116 (at block 506). For example, the electronic processor 102 controls the communication interface 112 to transmit bid units over the backchannel 300 to the server 200 in response to receiving the high-priority message. In the example of FIG. 2, the electronic processor 102 controls the communication interface 112 to transmit two bid units over the backchannel 300 to the server 200 at time T3, one bid unit at time T4, and one bid unit at time T5. In some examples, the specified number is zero. In other examples, the specified number is one or more.

The method 500 includes receiving, with the electronic processor 102, zero or more external bid units from each of the one or more servers via the backchannel 300 (at block 508). For example, the electronic processor 102 receives one bid unit from the server 200 via the backchannel 300 at times T4, T5, and T6 of FIG. 2.

The method 500 includes determining, with the electronic processor 102, whether the zero or more external bid units are more than or equal to the specified number of the bid units (at decision block 510). For example, the electronic processor 102 determines that zero bid units from the server 200 is less than the two bid units transmitted to the server 200 at time T3 of FIG. 2.

In response to determining that the zero or more external bid units are not more than or equal to the specified number of the bid units ("NO" at decision block 510), the method 500 includes controlling, with the electronic processor 102, the communication interface 112 to transmit information via the first wireless network using the increase in spectrum (at block 512). For example, the electronic processor 102 controls the communication interface 112 to transmit the information via the first wireless network 116 over the frequency bands F1 and F2 because the zero external bid units received from the server 200 at time T3 of FIG. 2 is less than the two transmitted bid units.

In response to determining that the zero or more external bid units are more than the specified number of the bid units ("YES" at decision block 510), the method 500 includes controlling, with the electronic processor 102, the communication interface 112 to not transmit information via the first wireless network (at block 514).

Figure 4:
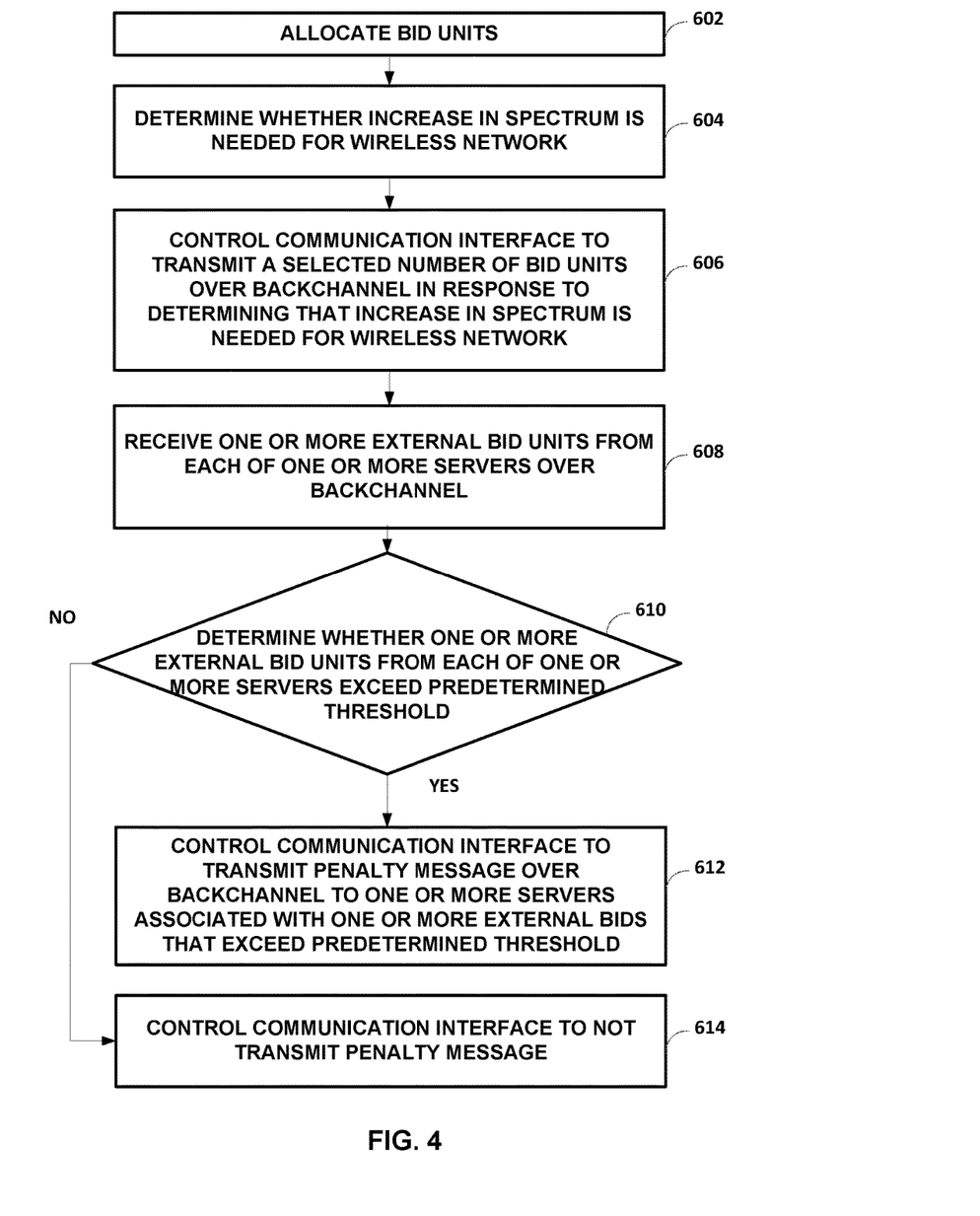
FIG. 4 is a flowchart illustrating a method for operating a server with the allocating, bidding, and policing programs, according to various embodiments of the present disclosure.

FIG. 4 is a flowchart illustrating a method 600. The method 600 is a method for operating a server with the allocating, bidding, and policing program, according to various embodiments of the present disclosure. For ease of understanding, the method 600 is described with respect to the second server 200 of the wireless communication system 10 of FIG. 1 and FIG. 2. However, the method 600 is equally applicable to the server 100 of FIG. 1 or any other additional server of the wireless communication system 10.

The method 600 includes allocating, with the electronic processor 202, bid units (at block 602). For example, the electronic processor 202 sets or resets a number of bid units available at time T1 of FIG. 2 using the allocating program 208 of FIG. 1. In some examples, the bid units are predetermined number. In the example of FIG. 2, the predetermined number is 3.

The method 600 includes determining, with the electronic processor 202, whether an increase in spectrum is needed for the second wireless network 216 that shares spectrum with the first wireless network 116 of the server 100 (at block 604). For example, the electronic processor 202 receives a high-priority message via the communication interface 212 and determines that the high-priority message requires a high-priority transmission by the communication interface 212 when the second wireless network 216 has an increased load.

The method 600 includes controlling, with the electronic processor 202, the communication interface 212 to transmit a specified number of bid units over the backchannel 300 in response to determining that the increase in the spectrum is needed for the second wireless network 216 (at block 606). For example, the electronic processor 202 controls the communication interface 212 to transmit bid units over the backchannel 300 to the server 100 in response to receiving the high-priority message. In the example of FIG. 2, the electronic processor 202 controls the communication interface 212 to transmit one bid unit over the backchannel 300 to the server 100 at time T5. In some examples, the specified number is zero. In other examples, the specified number is one or more.

The method 600 includes receiving, with the electronic processor 202, one or more external bid units from each of the one or more servers via the backchannel 300 (at block 608). For example, the electronic processor 202 receives one external bid unit from the server 100 via the backchannel 300 at times T4 and T5 of FIG. 2.

The method 600 includes determining, with the electronic processor 202, whether the one or more external bid units from the each of the one or more servers exceeds a predetermined threshold (at decision block 610). For example, the electronic processor 202 determines that the external bid units from the server 100 at times T3, T4, and T5 of FIG. 2 is collectively more than allotted amount of bid units, i.e., three bid units.

In response to determining that the one or more external bid units from the each of the one or more servers exceeds the predetermined threshold ("YES" at decision block 610), the method 600 includes controlling, with the electronic processor 202, the communication interface 212 to transmit a penalty message over the backchannel 300 to the one or more servers associated with the one or more external bids that exceed the predetermined threshold (at block 612). For example, the electronic processor 202 controls the communication interface 212 to transmit a penalty message over the backchannel 300 because the server 100 transmitted one bid more than the allotted amount of bids at time T5 of FIG. 2. The penalty message requires the server 100 to yield to the server 200 by not transmitting any information via the first wireless network 116 at time T5 of FIG. 2.

In response to determining that the one or more external bid units from the each of the one or more servers do not exceed the predetermined threshold ("NO" at decision block 610), the method 600 includes controlling, with the electronic processor 202, the communication interface 212 to not transmit a penalty message over the backchannel 300 to the one or more servers (at block 614).

Thus, the present disclosure provides, among other things, a wireless communication system with dynamic spectrum sharing. Various features and advantages of the present disclosure are set forth in the following claims.

What is claimed is:

1. A server comprising:
a communication interface configured to
communicate with one or more servers via a backchannel, and
control a terrestrial antenna to provide a wireless network;
a memory; and
an electronic processor communicatively connected to the memory, the electronic processor configured to
allocate bid units,
determine whether an increase in spectrum is needed for the wireless network, the wireless network sharing the spectrum with wireless networks provided by the one or more servers,
responsive to determining that the increase in the spectrum is needed for the wireless network, control the communication interface to transmit a specified number of the bid units to the one or more servers over the backchannel,
receive zero or more external bid units from each of the one or more servers,
determine whether the zero or more external bid units from the each of the one or more servers is more than or equal to the specified number of the bid units,
responsive to determining that the zero or more external bid units from the each of the one or more servers is not more than the specified number, control the communication interface to transmit information via the wireless network using the increase in the spectrum, and
responsive to determining that the zero or more external bid units from the each of the one or more servers is more than or equal to the specified number of the bid units, control the communication interface to not transmit the information via the wireless network.

2. The server of claim 1, wherein, to allocate the bid units, the electronic processor is further configured to set the bid units to a predetermined number.

3. The server of claim 2, wherein, to allocate the bid units, the electronic processor is further configured to reset the bid units to the predetermined number after a predetermined period of time.

4. A server comprising:
a communication interface configured to
communicate with one or more servers via a backchannel, and
control a terrestrial antenna to provide a wireless network;
a memory; and
an electronic processor communicatively connected to the memory, the electronic processor configured to
allocate bid units,
determine whether an increase in spectrum is needed for the wireless network, the wireless network sharing the spectrum with wireless networks provided by the one or more servers,
responsive to determining that the increase in the spectrum is needed for the wireless network, control the communication interface to transmit a specified number of the bid units to the one or more servers over the backchannel,
receive zero or more external bid units from each of the one or more servers,
determine whether the zero or more external bid units from the each of the one or more servers is more than or equal to the specified number of the bid units, and
responsive to determining that the zero or more external bid units from the each of the one or more servers is not more than the specified number, control the communication interface to transmit information via the wireless network using the increase in the spectrum, wherein, to determine whether the increase is needed for the wireless network, the electronic processor is further configured to receive a high-priority message, determine whether the wireless network is capable of transmitting the high-priority message, and determine that the increase is needed for the wireless network in response to determining that the wireless network is not capable of transmitting the high-priority message.

5. A server comprising:

a communication interface configured to
communicate with one or more servers via a backchannel, and
control a terrestrial antenna to provide a wireless network;

a memory; and an electronic processor communicatively connected to the memory, the electronic processor configured to
allocate bid units,
determine whether an increase in spectrum is needed for the wireless network, the wireless network sharing the spectrum with wireless networks provided by the one or more servers,
responsive to determining that the increase in the spectrum is needed for the wireless network, control the communication interface to transmit a specified number of the bid units to the one or more servers over the backchannel,
receive zero or more external bid units from each of the one or more servers,
determine whether the zero or more external bid units from the each of the one or more servers is more than or equal to the specified number of the bid units, and
responsive to determining that the zero or more external bid units from the each of the one or more servers is not more than the specified number, control the communication interface to transmit information via the wireless network using the increase in the spectrum,
wherein the electronic processor is further configured to determine whether the zero or more external bid units from the each of the one or more servers is an overconsumption.

6. The server of claim 5, wherein the electronic processor is further configured to
determine that the zero or more external bid units from a second server of the one or more servers is the overconsumption, and
control the communication interface to transmit a penalty message to the second server.

7. A wireless communication system comprising:

a first server providing a first wireless network; and
a second server providing a second wireless network using the same spectrum as the first wireless network,
wherein the first server includes
a communication interface configured to
communicate with one or more servers via a backchannel, the one or more servers including the second server, and
control a terrestrial antenna to provide the first wireless network;
a memory; and
an electronic processor communicatively connected to the memory, the electronic processor configured to
allocate bid units,
determine whether an increase in the spectrum is needed for the first wireless network,
responsive to determining that the increase in the spectrum is needed for the first wireless network, control the communication interface to transmit a specified number of the bid units to the one or more servers over the backchannel,
receive zero or more external bid units from each of the one or more servers,
determine whether the zero or more external bid units from the each of the one or more servers is more than or equal to the specified number of the bid units,
responsive to determining that the zero or more external bid units from the each of the one or more servers is not more than the specified number, control the communication interface to transmit information via the first wireless network using the increase in the spectrum, and
responsive to determining that the zero or more external bid units from the each of the one or more servers is more than or equal to the specified number of the bid units, control the communication interface to not transmit the information via the first wireless network.

8. The wireless communication system of claim 7, wherein, to allocate the bid units, the electronic processor is further configured to set the bid units to a predetermined number.

9. The wireless communication system of claim 8, wherein, to allocate the bid units, the electronic processor is further configured to reset the bid units to the predetermined number after a predetermined period of time.

10. A wireless communication system comprising:

a first server providing a first wireless network; and
a second server providing a second wireless network using the same spectrum as the first wireless network,
wherein the first server includes
a communication interface configured to
communicate with one or more servers via a backchannel, the one or more servers including the second server, and
control a terrestrial antenna to provide the first wireless network;
a memory; and
an electronic processor communicatively connected to the memory, the electronic processor configured to
allocate bid units,
determine whether an increase in the spectrum is needed for the first wireless network,
responsive to determining that the increase in the spectrum is needed for the first wireless network, control the communication interface to transmit a specified number of the bid units to the one or more servers over the backchannel,
receive zero or more external bid units from each of the one or more servers,
determine whether the zero or more external bid units from the each of the one or more servers is more than or equal to the specified number of the bid units, and
responsive to determining that the zero or more external bid units from the each of the one or more servers is not more than the specified number, control the communication interface to transmit information via the first wireless network using the increase in the spectrum,
wherein, to determine whether the increase is needed for the first wireless network, the electronic processor is further configured to
receive a high-priority message,
determine whether the first wireless network is capable of transmitting the high-priority message, and
determine that the increase is needed for the first wireless network in response to determining that the first wireless network is not capable of transmitting the high-priority message.

11. A wireless communication system comprising:
a first server providing a first wireless network; and
a second server providing a second wireless network using the same spectrum as the first wireless network,
wherein the first server includes
a communication interface configured to
communicate with one or more servers via a backchannel, the one or more servers including the second server, and
control a terrestrial antenna to provide the first wireless network;
a memory; and
an electronic processor communicatively connected to the memory, the electronic processor configured to
allocate bid units,
determine whether an increase in the spectrum is needed for the first wireless network,
responsive to determining that the increase in the spectrum is needed for the first wireless network, control the communication interface to transmit a specified number of the bid units to the one or more servers over the backchannel,
receive zero or more external bid units from each of the one or more servers,
determine whether the zero or more external bid units from the each of the one or more servers is more than or equal to the specified number of the bid units, and
responsive to determining that the zero or more external bid units from the each of the one or more servers is not more than the specified number, control the communication interface to transmit information via the first wireless network using the increase in the spectrum,
wherein the electronic processor is further configured to determine whether the zero or more external bid units from the each of the one or more servers is an overconsumption.

12. The wireless communication system of claim 11, wherein the electronic processor is further configured to
determine that the zero or more external bid units from the second server is the overconsumption, and
control the communication interface to transmit the information via the first wireless network using the spectrum assigned to the second server.

13. A wireless communication system comprising:
a first server providing a first wireless network; and
a second server providing a second wireless network using the same spectrum as the first wireless network,
wherein the first server includes
a communication interface configured to
communicate with one or more servers via a backchannel, the one or more servers including the second server, and
control a terrestrial antenna to provide the first wireless network;
a memory; and
an electronic processor communicatively connected to the memory, the electronic processor configured to
allocate bid units,
determine whether an increase in the spectrum is needed for the first wireless network,
responsive to determining that the increase in the spectrum is needed for the first wireless network, control the communication interface to transmit a specified number of the bid units to the one or more servers over the backchannel,
receive zero or more external bid units from each of the one or more servers,
determine whether the zero or more external bid units from the each of the one or more servers is more than or equal to the specified number of the bid units, and
responsive to determining that the zero or more external bid units from the each of the one or more servers is not more than the specified number, control the communication interface to transmit information via the first wireless network using the increase in the spectrum,
wherein the second server includes
a communication interface configured to
communicate with a second one or more servers via the backchannel, the second one or more servers including the first server, and
control a second terrestrial antenna to provide the second wireless network;
a memory; and
an electronic processor communicatively connected to the memory, the electronic processor configured to
allocate bid units,
determine whether an increase in the spectrum is needed for the second wireless network,
responsive to determining that the increase in the spectrum is needed for the second wireless network, control the communication interface to transmit a second specified number of the bid units to the second one or more servers over the backchannel,
receive a second zero or more external bid units from each of the second one or more servers,
determine whether the second zero or more external bid units from the each of the second one or more servers is more than or equal to the second specified number of the bid units, and
responsive to determining that the zero or more external bid units from the each of the one or more servers is not more than the second specified number, control the communication interface to transmit information via the second wireless network using the increase in the spectrum.

14. The wireless communication system of claim 13, wherein, to allocate the bid units, the electronic processor of the second server is further configured to
set the bid units to a predetermined number, and
reset the bid units to the predetermined number after a predetermined period of time.

15. The wireless communication system of claim 13, wherein, to determine whether the increase is needed for the second wireless network, the electronic processor of the second server is further configured to
- receive a high-priority message,
- determine whether the second wireless network is capable of transmitting the high-priority message, and
- determine that the increase is needed for the second wireless network in response to determining that the second wireless network is not capable of transmitting the high-priority message.

16. The wireless communication system of claim 13, wherein responsive to determining that the second zero or more external bid units from the each of the second one or more servers is more than or equal to the second specified number of the bid units, control the communication interface to not transmit the information via the second wireless network.

17. A method for operating a server to provide a wireless network, the method comprising:
- allocating, with an electronic processor, bid units;
- determining, with the electronic processor, whether an increase in spectrum is needed for the wireless network, the wireless network sharing the spectrum with wireless networks provided by the one or more servers;
- controlling, with the electronic processor, a communication interface to transmit a specified number of the bid units to one or more servers over a backchannel in response to determining that the increase in the spectrum is needed for the wireless network;
- receiving, with the electronic processor, zero or more external bid units from each of one or more servers;
- determining, with the electronic processor, whether the zero or more external bid units are more than or equal to the specified number of the bid units;
- controlling, with the electronic processor, the communication interface to transmit information via the wireless network using the increase in the spectrum in response to determining that the zero or more external bid units are not more than or equal to the specified number of the bid units; and
- controlling the communication interface to not transmit the information via the wireless network in response to determining that the zero or more external bid units from the each of the one or more servers is more than the specified number of the bid units.

* * * * *